US00RE45529E

(19) United States
(12) Reissued Patent
Fucik et al.

(10) Patent Number: US RE45,529 E
(45) Date of Reissued Patent: May 26, 2015

(54) SYNTHETIC STONE OF HIGH TRANSLUCENCE, METHOD OF ITS PRODUCTION AND USE

(75) Inventors: Ivan Fucik, Bustehrad (CZ); Michal Poljakov, Kladno (CZ)

(73) Assignee: Michal Poljakov, Kladno (CZ)

(21) Appl. No.: 13/972,103

(22) Filed: Aug. 21, 2013

Related U.S. Patent Documents

Reissue of:
(64) Patent No.: 8,362,111
Issued: Jan. 29, 2013
Appl. No.: 11/991,602
PCT Filed: Sep. 13, 2006
PCT No.: PCT/CZ2006/000060
§ 371 (c)(1),
(2), (4) Date: Nov. 9, 2009
PCT Pub. No.: WO2007/031039
PCT Pub. Date: Mar. 22, 2007

(30) Foreign Application Priority Data

Sep. 14, 2005 (CZ) ..... PV 2005-574

(51) Int. Cl.
*C09D 5/29* (2006.01)
*B44C 5/04* (2006.01)
*E04F 13/08* (2006.01)
*B44F 9/04* (2006.01)

(52) U.S. Cl.
CPC ..... *B44C 5/0453* (2013.01); *E04F 13/08* (2013.01); *E04F 2290/026* (2013.01); *B44C 5/0461* (2013.01); *B44F 9/04* (2013.01)

(58) Field of Classification Search
USPC ..... 523/171
See application file for complete search history.

(56) References Cited

U.S. PATENT DOCUMENTS

| | | | | |
|---|---|---|---|---|
| 3,396,067 | A | 8/1968 | Schafer | |
| 3,847,865 | A * | 11/1974 | Duggins | 524/437 |
| 4,159,301 | A * | 6/1979 | Buser et al. | 264/331.15 |
| 4,446,177 | A | 5/1984 | Munoz et al. | |
| 4,734,452 | A | 3/1988 | Hashimoto et al. | |
| 5,237,004 | A | 8/1993 | Wu et al. | |
| 5,304,592 | A | 4/1994 | Ghahary | |
| 5,476,895 | A | 12/1995 | Ghahary | |
| 6,056,904 | A | 5/2000 | Wiener | |
| 6,076,954 | A | 6/2000 | Gisko | |
| 6,773,643 | B2 * | 8/2004 | Beitelshees et al. | 264/73 |
| 6,866,914 | B2 | 3/2005 | Yamanashi et al. | |

FOREIGN PATENT DOCUMENTS

| | | | | |
|---|---|---|---|---|
| EP | 0952124 | | 10/1999 | |
| JP | 274317 | | 3/1990 | |
| JP | 05-032720 | * | 9/1993 | C08F 20/14 |
| WO | 9308993 | | 5/1993 | |

OTHER PUBLICATIONS

Translation of JP-05-032720.*
Translation of JP-05-032720 (1993).*
E. Flick, *Plastic Additives, An Industrial Guide*, Noyes Publication, 2nd Ed. (1993), pp. 293-296.
Aluminum Products of Almatis, Inc., http://www.alcoa.com/global/en/environment/msds_view.asp?LoadMSDS=901463, (2004).
Almatis Hydral Series Aluminum Trihydroxides, http://www.ilyacorp.co.kr/product/pdf/H710&PGA_SD.pdf, (2003).

* cited by examiner

*Primary Examiner* — Ling Xu
(74) *Attorney, Agent, or Firm* — Dykema Gossett PLLC

(57) ABSTRACT

Stone is formed from 5 to 60% by weight of polymerised, low-viscosity, transparent or low-colour-resin, 20 to 90% by weight of spherical alumina trihidrate $Al_2O_3.3H_2O$ containing less regular particles containing, advantageously 0 to 100% by weight of a transparent or translucent substitute of alumina trihydrate, and/or with 0 to 20% or pre-prepared particulate, filled resin of a chosen colour, and/or mineral particles and less than 2% by weight of luminophor. These individual components are mixed intensely whilst extracting included gaseous parts. Extraction is carried out whilst mixing, and/or after mixing, and/or before mixing. The mixture is initiated by introducing a starter and intensely mixing it into the mixture. The mixture is poured into a mould or onto a moving endless belt. The cured synthetic stone is removed from the mould or the hardened composite is taken off the the belt. Synthetic stone can be used in products as a light carrier.

20 Claims, 1 Drawing Sheet

SYNTHETIC STONE OF HIGH TRANSLUCENCE, METHOD OF ITS PRODUCTION AND USE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The invention concerns synthetic stone with high translucence, the method of its production and use in the production of decorative, constructional and useable items for internal or external use enabling it to be used also as a light carrier.

BACKGROUND OF THE INVENTION

Decorative constructional materials based on relatively light, synthetic stone with a certain translucency are already well-known. They are largely particulate composite systems with a binder based on the principle of low-colour, clear reactive resin with a larger content of powder filler and other additional substances relieving technology, modifying properties, and influencing processing, etc. Translucent reactive polyester resin is an example of the binder used. Powdery calcium carbonate, silica powder, aluminium hydroxide (also known as ATH, alumina trihydrate, aluminium trihydroxide, hydrated alumina) plaster, marble, etc. are examples of fillers used. Peroxides such as MEKP are generally used as initiators. Actual production takes place by introducing a reactive mixture into a mould and subsequently removing it from the mould after sufficient hardening, and then carrying out the necessary mechanical treatment. These products are described in the U.S. Pat. Nos. 3,396,067; 3,488,246; 3,642,975; 3,847,865 and 4,107,135. Synthetic stone described in the above-mentioned patents has good mechanical and visual properties. However, it is not very translucent, and this is quickly worsened by damage to its surface caused easily by scratching, e.g. mechanical abrasion during handling.

A somewhat better translucency and appearance, as well as more suitable behaviour is displayed by products with a limited amount of pigments and with surface protection provided by a so-called "gel coat", for example based on unfilled iso-neopenthylglycolic polyester. These types of synthetic stone are products with a somewhat enhanced translucency and with greater resistance to surface damage, however, not providing a high translucency.

Another improvement to the translucency of this type of product can be achieved using a highly pure pseudo-crystalline filler made of alumina trihydrate, with chemical formula $Al_2O_3 \times 3\ H_2O$ (alumina trihydrate), containing $Al(OH)_3$ with a purity of greater than 99% and a refractive index of light of between 1.4 and 1.65 comprising of a mixture of irregular powder particles. This filler is made of agglomerates, monocrystals, and fine granules with particles less than approx. 70 μm in length, possibly with translucent and/or transparent particles. In particular using resin based on acrylate modified polyesters and also primarily using acrylate reactive resins with a refractive index of light approaching the refractive index of the alumina trihydrate used, according to U.S. Pat. No. 4,159,301. These products are somewhat more translucent. They have a better surface and extraordinarily high resistance to surface damage, which results in a reduction in translucency. Products of this type often referred to as "solid surface" achieve a certain three-dimensional projection of space-depth, as a result of their optically more suitable components, but there is only a partial increase in their translucency.

U.S. Pat. No. 5,286,290 describes the use of a coloured alumina trihydrate without the use of pigments which reduce translucency. Not even this leads to a significant improvement in translucency. US. Pat. Nos. 4,085,246; 4,159,307 and 5,304,592 describe the use of hollow and later full, translucent partial substitutes of the filler used, e.g. using so-called glass "microspheres, micropearls", particles such as polypropylene, polyethylene, HD-polyethylene, etc. Their use actually leads to a targeted reduction in specific weight and to an increase in resistance to thermal shock, but there is no significant increase in translucency. Constructional, decorative materials of this type labelled as synthetic stone "cultured marble", or "cultured onyx" displays very good mechanical properties, a nice natural appearance and are pleasant to touch. However, light only passes through them to a very limited extent. The translucency of such materials, measured on 6 mm thick test plates with light shining on them from one side, is very low and generally of the order deeply under of 4 to 5%.

The submitted invention proposes to eliminate the deficiencies mentioned above and create a synthetic stone with high translucency.

SUMMARY OF THE INVENTION

Synthetic stone with high translucency based on low-viscosity, reactive, translucent resin, in particular methylmethacrylate or neopenthylglycolic-polyester type, alumina trihydrate, its substitute and crushed material so-called chips. The subject-matter of the invention consists in the fact, that it is created from a hardened mixture which contains 5 to 60% by weight of binder. The binder is created from polymerised, colourless or low-colour resin with a refractive index of light of the polymer which is the same as the refractive index of light of alumina trihydrate or only differs from this refractive index by less than ±12%. The mixture also contains 20 to 90% by weight of filler formed by globular and/or spherical alumina trihydrate $Al_2O_3.3\ H_2O$ which contains less than 90% by weight of less regular particles—aggregates, agglomerates, crushed material and crystals, and containing 0 to 100% by weight of transparent to translucent alumina trihydrate substitute, and containing a 0 to 20% by weight of pre-prepared particulate, filled, hardened, coloured resin, especially in form of crushed material known as chips, greater than 200 μm in size, and/or mineral particales. Furthermore the mixture contains less than 2% by weight of luminophor. As a matter of course, a synthetic stone contains the other well-known additional substances, relieving technology, modifying properties, and influencing processing, etc, of course.

A suitable composition of synthetic stone contains 25 to 50% by weight of binder created from polymerised, reactive, translucent, low-colour resin with a refractive index of light which is the same as the refractive index of light of alumina trihydrate (*1.58*), or only differs from this refractive index by less than ±12%. It contains 20 to 90% by weight of filler formed by globular and/or spherical alumina trihydrate $Al_2O_3.3\ H_2O$, which contains less than 90% by weight or less than 50% by weight of less regular particles—aggregates, agglomerates, crushed material, and crystals. It also contains 0 to 100% by weight of transparent to translucent alumina trihydrate substitute.

In the next suitable composition the binding resin is advantageously a metacrylate or polyester type with a viscosity advantageously lower than 100 [mPas] *mPa·s*. The medium size of particles in the aluminatrihydrate filler used is greater than 15 μm and less than 200 μm.

For the next suitable composition the surface area of the filler used is less than BET 0.9 $m^2/g$, or advantageously less than 0.4 $m^2/g$.

In another suitable composition the filler substitute is a polymer with particles less than 15 mm in size, with a refractive index of light the same as the refractive index of light of alumina trihydrate or differing by up to ±12%.

In further advantageous composition the synthetic stone contains a polymeric substitute, which is a polyaroma—pearl-like copolymer of styrene with divinylbenzene, with particle size largely 5 μm to 2000 μm, or the size of particles 100 μm to 400 μm.

The principle behind the method of production of the synthetic stone according to this invention consists in intensively mixing a defined amount of individual components of synthetic stone in accordance with this invention, whilst extracting off gaseous parts. Extraction is carried out whilst stirring, and/or even before it and/or after stirring. The mixture is initiated by introducing the starter and by intensively stirring it into the mixture. This mixture is transferred to the mould, or it is poured onto an endless moving belt. The ready synthetic stone is then removed from the mould or the hardened composite is removed from the belt. Synthetic stone is used as a light carrier for lighting fixtures, such as guide rails, housings, luminous walls and wall elements, panels, lamps, luminous banisters, and signs for toilets kitchens, hospitals, spas, hotels, restaurants, in particular for sinks, baths, and work desks. It is also used as a light carrier for moulded plastics.

The advantage of synthetic stone according to the invention is that the filler is made of globular to spherical particles, possibly with a portion of less regular particles, where appropriate with a pearl-like substitute of alumina trihydrate, it does not contain innumerous polygonal micro-surfaces and micro-areas which cause a worsened wettability, poly-directional reflection, refraction, and dispersion of light in the synthetic stone. Thus originates a product with a high translucency. The relatively low viscosity of the resin syrup allows all filler surfaces to be fully moistened and fills all spaces between its particles, as well as all micro-areas of its agglomerate and aggregate parts and possible incorporated substitutes including the extraction of gaseous parts contained in and between them. The advantage is that in this configuration there are no unfilled spaces or micro-areas or bubbles which may occur at higher viscosities despite the evacuation process during homogenisation and lead, as a result of the reflection, refraction and dispersion they cause, to a growth in opacity, a reduction in translucence and a loss in their three-dimensional action. Another advantage is offered by partial to full substitution of the alumina trihydrate filler by a translucent polymer with a refractive index of light which is the same as that of the binder used and alumina trihydrate or only differs from this refractive index by till ±12%, and with a high internal transmission of light (transmittance). The substitute enables adjustable modification of the particulate interspaces of alumina trihydrate, leading to a reduction in reflection, refraction, dispersion and to an increase in translucence. Besides this, it reduces the specific weight of the synthetic stone in a well-known way, increases the thermal elasticity and thus resistance to thermal shock. A surprisingly large increase in translucence of the synthetic stone is brought about by the filler's spherical particles and its relatively low surface area. Such a synthetic stone is highly translucent and enables the production of products permitting an extraordinary combination between light, shape, colour and strength. Adjustable transparency, translucence and luminescence in connection with the possibility of a luminous design promote visualisation, the feeling of freedom, purity and brilliance. The surprisingly high translucence also provides an extraordinary deep three-dimensional effect, bringing a strong spatial perception of the internal matter and enables its complex structure to excel. This results in the unusual interactive action of chips, design and colours. The stone is pleasant to touch and provides for a new combination of light, colours, inlaying, thermoforming, other methods of forming, and use in many other industries.

BRIEF DESCRIPTION OF DRAWINGS

The influence of geometry and the size of the surface area of filler particles on the interaction with light is represented in the attached drawing.

DETAILED DESCRIPTION OF THE INVENTION

Figure 1:
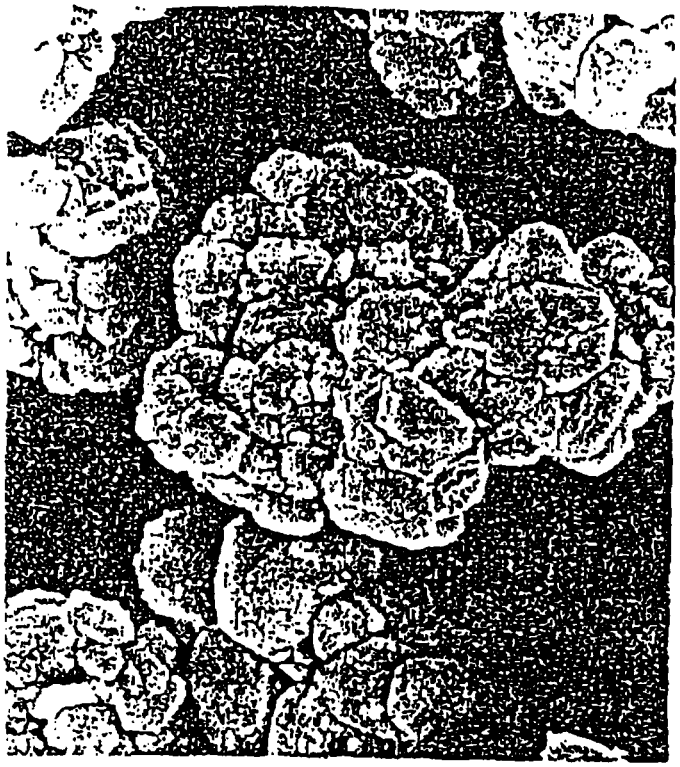
FIG. 1 shows irregular agglomerates of common alumina trihydrate approximately 80 μm in size and on FIG. 2 there is globular alumina trihydrate approximately 80 μm in size with a small fraction of irregular agglomerates.
Figure 2:
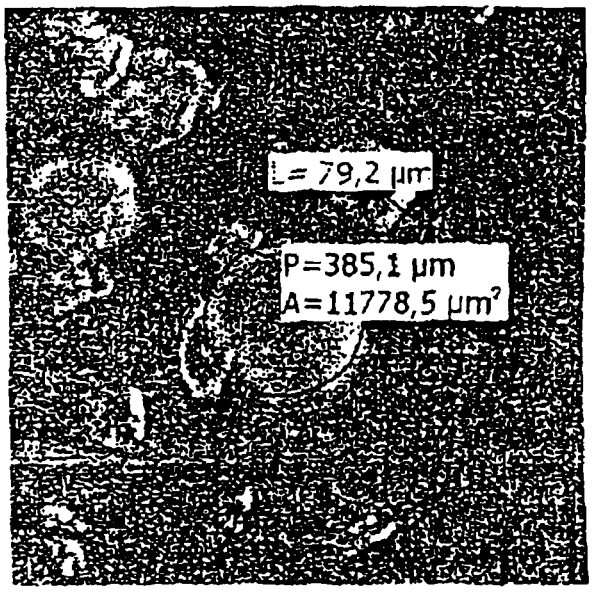

The results of long-term testing during the development of the synthetic stone, which is the subject-matter of the invention, demonstrate that in spite of the translucence and relatively close refractive indices of light of the binder and filler in common synthetic stones, their transmittance as a whole for light is surprisingly low. It is strongly influenced by other properties of both of these basic components. Not only is the purity, angle of refraction of light, size and amount of particles in the used filler and viscosity and wettable character of the binder important, but also the actual geometry of the particles. Reflection, refraction, and dispersion of light grows in the synthetic stone with the amount, segmentation, number and directions of surfaces and micro-areas of agglomerates, aggregates and crystals in a common filler (FIG. 1). However, the efficiency of optical dispersion grows with a reduction in the size of filler particles and a growth in surface area. Binders displaying a higher viscosity do not have a very good ability to penetrate into all micro-areas and surfaces, which then with any potentially remaining bubbles and unfilled micro-areas create additional "multiple interfaces" for further light refraction and dispersion. The total translucence of the composites is the sum of their direct and diffusion transmittance. The size of reflection, refraction and direct transmittance of individual components, as well as the resulting transmittance of the composite as a whole, influenced particularly strongly by light dispersion, plays an important role. Internal multiple reflection, refraction and dispersion of light in the material of conventional synthetic stones thus appears to be a strong limitation to their translucence. The fillers they use are powdery, multi-particulate, polygonal systems with a significantly greater density than the relevant binders. They are generally comprised of irregular particles with a greater surface area, generally significantly greater than 1.0 $m^2/g$, with many bounding surfaces for reflection, refraction, and dispersion. Their infinite, poly-directional, light-interacting micro-surfaces cause a rise in opacity in the synthetic stone up to an unacceptable amount. The translucence of these particulate composite systems is low even if they display excellent technical, visual and tactile behaviour. Synthetic stone includes also another common supplementary components, for more easier technology and workmanship, for modification of properties of synthetic stone, etc.

EXAMPLE 1

68.8 weight parts (35.6% by weight) of methacrylate, reactive resin with a viscosity of 4 mPas and a refractive index of light of 1.4196 was mixed with 106.5 weight parts (55.11% by weight) of powdery alumina trihydrate of specific weight 2.4 g/cm$^3$, a refractive index of light of 1.58, containing 70% by weight of globular particles with an arithmetic middle diameter of 67 μm and with 15.6 weight parts (8.54% by weight) of white chips of diameter 0.5-3.15 mm, as well as with 0.1 weight parts of powdery titanate oxide (0.05% by weight). The mixture was polymerised in a flat frame mould separated by a wax separator during initiation with 1.35 weight parts of a peroxide starter. The perception of translucence of the formed synthetic stone, expressed as the light transmission, measured through a 6 mm thick plate, came to 22.5%.

EXAMPLE 2

806 weight parts (35.2% by weight) of metacrylate, reactive resin with a viscosity of 4 [mPas] *mPa·s* and a refractive index of light of 1.4196 was mixed with 1470 weight parts (64.17% by weight) of filler comprised of 1120 weight parts (76.2% by weight of filler) of powdery alumina trihydrate ($Al_2O_3 \cdot 3\ H_2O$ of specific weight 2.4 g/cm$^3$), and 350 weight parts (23.8% [be] *by* weight) of a substitute formed from a translucent, styrene-divinylbenzene pearl-like copolymer with particles 30 to 350 μm in size. After evacuation the mixture was polymerised in a flat, longitudinal mould modified by a silicon separator, during initiation with 14.7 weight parts (0.64% by weight) of a combination, peroxydicarbonate starter. A 6 mm thick layer of the polymeric stone formed achieved a value of 24.2% when determining the light transmission.

EXAMPLE 3

A polymeric stone in the shape of a plate of thickness 6 mm and with a light transmission of 30% was formed by mixing 708 weight parts (32.7% by weight) of reactive, metacrylate resin with a viscosity of 26 mPas and a refractive index of light of 1.431, with 1445 weight parts (66.6% by weight) of powdery alumina trihydrate with a refractive index of light of 1.58, with 68.8% by weight of spherical alumina trihydrate, with an arithmetical mean diameter of 67 μm and surface area of approx. 0.2 m$^2$/g, under evacuation and initiated with 14.2 weight parts (0.6% by weight) of a peroxymaleatoe starter and polymerised in flat frame mould separated by a wax separator.

EXAMPLE 4

A 6 mm thick slab of synthetic stone with a light transmission of 34% was produced by intensively mixing 690 weight parts (38% by weight) of unsaturated isoftal/neopentylglycolpolyester resin modified by methylmetacrylate, with a viscosity of 62 mPas and a refractive index of light of 1.4888, with 1120 weight parts (61.5% by weight) of powdery alumina trihydrate, with a refractive index of light of 1.58, containing 85% by weight of globular alumina trihydrate with an average size of globular particles of 80 μm and a surface area of 0.1 m$^2$/g, under evacuation and initiated with 9.4 weight parts (0.5% by weight) of a keteperoxydic starter. Polymerisation was carried out in a flat, oval, case mould. The casting was removed from the mould once it had hardened.

EXAMPLE 5

454 weight parts (40.55% by weight) of metacrylate, reactive resin with a viscosity of 180 mPas and a refractive index of light of 1.4306 was mixed with 660 weight parts (58.95% by weight) of filler, composed of 560 weight parts (84.8% by weight of filler) of powdery alumina trihydrate, with a surface area of approx. 0.22 m$^2$/g, containing 70% by weight of globular parts with an arithmetic main diameter of particles of 56 μm and 100 weight parts (15.15% by weight of filler) of substitute, of the same composition as in example 2, representing another globular share. Polymerisation of the mixture was carried out after extracting gaseous parts under initiation with 5.6 weight parts (0.5% by weight) of peroxymaleate starter on a belt mould. A 6 mm thick slab of the hardened polymeric stone displayed a light transmission of 40.3%. After grinding, mechanically modifying and thermoforming it was used in connection with back-lighting as a guiding handrail on a banister.

EXAMPLE 6

53% light transmission["] was measured on a 6 mm thick test slab made of polymeric stone formed by polymerisation of a casting mixture composed of 393 weight parts (57.32% by weight) of metacrylate resin with a refractive index of light of 1.4287 and a viscosity of 14 [mPas] *mPa·s*, 283 weight parts (41.28% by weight) of filler formed from a single substitute made up of pearls of a pure copolymer of styrene with divinylbenzene with particles less than 250 μm in size, 2.5 weight parts (0.36% by weight) of green pigment paste. The mixture was initiated by 7.1 weight parts (1.04% weight) of a peroxymaleate starter and polymerisation was carried out in a case mould. The formed and mechanically machined synthetic stone was fitted with LED [diods] *diodes* and used as a light carrier in the form of a luminous wall element.

EXAMPLE 7

Synthetic stone with high translucency and with a three and half times increase in the intensity of light for a 6 ["] mm thick slab lit by a UV source (UV diode, 1 mW, <20°, λ=400 nm), was created by polymerisation of 353 weight parts (32.47% by weight) of metacrylate resin with a viscosity of 24 [mPas] *mPa·s* and a refractive index of light of 1.434, with 722 weight parts (66.42% by weight) from 70% spherical alumina trihydrate with a refractive index of light of 1.58 and 5% weight parts (0.65% by weight) of luminophor Rylux VPA-T, initiated by 7.1 weight parts of a peroxymaleate starter in a frame mould.

EXAMPLE 8

The method of production of synthetic stone with high translucence.

Weighed components, mentioned in the previous examples, were placed into a mixing bowl and thoroughly homogenised by mixing intensely. Evacuation was performed during the course of this process, and possibly before and/or after finishing this process in order to deaerate the mixture. Initiation of polymerisation of the mixture binder was carried out by introducing an set amount of starter and thoroughly mixing it in. The resulting reactive mixture was inserted into a separated mould, for example for the production of sinks. The final product was removed from the mould after the mixture had hardened.

Industrial Applicability

The invention can be used in the building industry, for furnishing interiors and exteriors, in the furniture industry, health industry and in advertising.

The invention claimed is:

1. A synthetic stone product which displays a light transmission through a 6 mm plate thereof [at least] *of* 22.5 *to 53*% and which comprises a hardened mixture of:

(a) 5 to 60 wt % of a polymerized resin binder selected from the group consisting of methylmethacrylate and neopentylglycolic-polyester, said binder having a refractive index of light [below 1300 mPas] *which varies less than 12% from 1.58*, and (b) [20 to 90] *55.11 to 84.8* wt % of a filler comprising [at least 68.6] *68.8 to 85* wt % globular and/or spherical alumina trihydrate, [$Al_2O_3$—$3H_2O$] $Al_2O_3.3H_2O$, a surface area of the filler *according to BET* being less than [BET] 0.9 $m^2/g$.

2. The synthetic stone product according to claim 1, wherein the binder resin has a viscosity of less than 100 [mPas] *mPa·s*.

3. The synthetic stone product according to claim 1, wherein the medium size of particles of the filler is greater than 15 μm and less than 200 μm.

4. A synthetic stone product with high translucence which comprises a hardened mixture of:

(a) 5 to 60 wt % of a polymerized resin binder selected from the group consisting of methylmethacrylate and neopentylglycolic-polyester, and (b) 20 to 90 wt % of a filler [comprising] *consisting of* globular and/or spherical styrene-divinylbenzene copolymer, a surface area of the filler *according to BET* being less than [BET] 0.9 $m^2/g$.

5. The synthetic stone product according to claim 4, wherein the filler has a particle size less than 15 mm whose refractive index of light differs from the refractive index of light of alumina trihydrate by no more than ±12%.

6. The synthetic stone product according to claim 4, wherein the copolymer of styrene and divinylbenzene has a particle size ranging from 5 μm to 2000 μm.

7. The synthetic stone product according to claim 6, wherein the copolymer of styrene and divinylbenzenehas a particle size ranging from 100 μm to 400 μm.

8. A method of production of a synthetic stone product with high translucence according to claim [6] *4*, comprising the steps of:

(a) mixing the polymerized binder and filler to form a mixture, (b) pouring the mixture into a mold, (c) curing the mixture in the mold, and (d) removing the cured mixture as a synthetic stone product from the mold.

9. The synthetic stone product according to claim 1, wherein said filler comprises 70 wt % globular alumina trihydrate.

10. The synthetic stone product according to claim 1, wherein said filler comprises 68.8 wt % spherical alumina trihydrate.

11. The synthetic stone product according to claim 1, wherein said filler comprises 85 wt % globular alumina trihydrate.

12. The synthetic stone product according to claim 4, wherein said filler consists of globular and/or spherical [styrene-divinlbenzene] *styrene-divinylbenzene* copolymer.

*13. The synthetic stone product according to claim 4, wherein the binder has a viscosity less than 100 mPa·s.*

*14. The synthetic stone product according to claim 4, wherein the surface area of the filler according to BET is less than 0.4 $m^2/g$.*

*15. The synthetic stone product according to claim 1, wherein the surface area of the filler according to BET is less than 0.4 $m^2/g$.*

*16. The method according to claim 8, wherein the polymerized binder has a viscosity of less than 1300 mPa·s.*

*17. The method according to claim 16, wherein the polymerized binder has a viscosity of less than 100 mPa·s.*

*18. A method of production of a synthetic stone product with high translucence according to claim 1, comprising the steps of:*

*(a) mixing the polymerized binder and filler to form a mixture,*

*(b) pouring the mixture into a mold,*

*(c) curing the mixture in the mold, and*

*(d) removing the cured mixture as a synthetic stone product from the mold.*

*19. The method according to claim 18, wherein the polymerized binder has a viscosity of less than 1300 mPa·s.*

*20. The method according to claim 19, wherein the polymerized binder has a viscosity of less than 100 mPa·s.*

* * * * *